Feb. 5, 1963    C. G. GORDON ET AL    3,076,920
TORQUE MOTORS
Filed Sept. 1, 1960
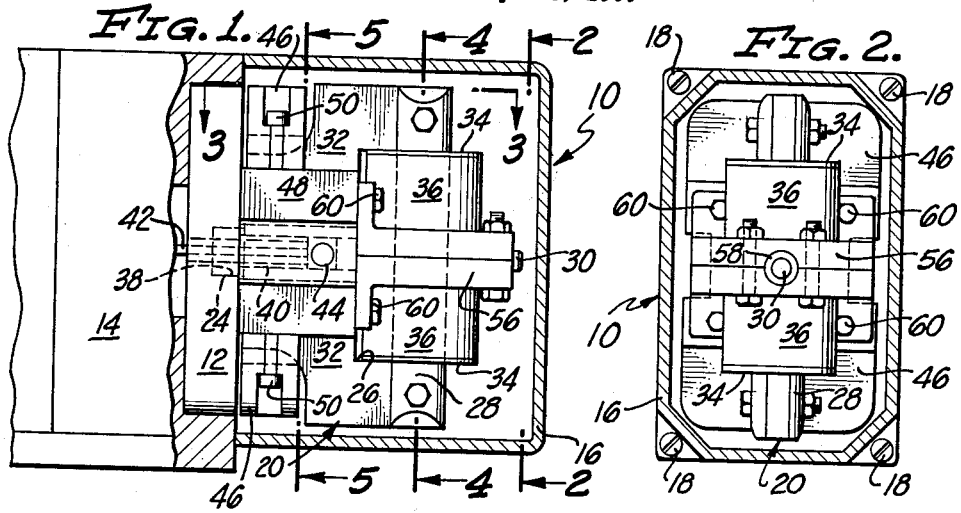
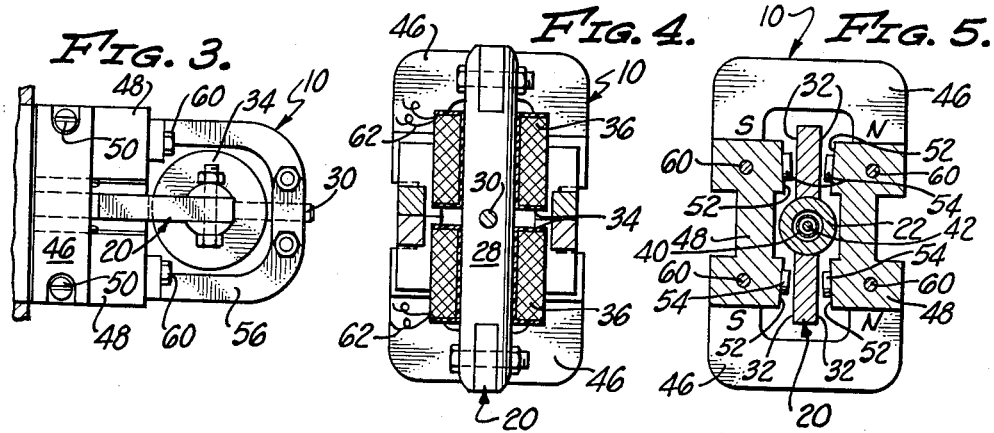
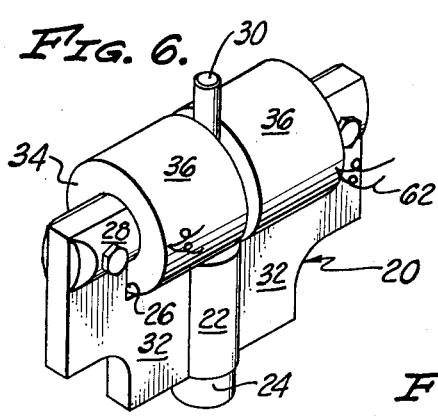
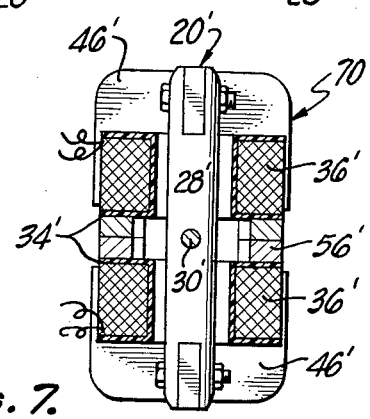
INVENTORS
CARROLL G. GORDON,
WILLIAM F. STOESSER
BY
ATTORNEY

United States Patent Office 3,076,920
Patented Feb. 5, 1963

3,076,920
TORQUE MOTORS
Carroll G. Gordon, William Court, Menlo Park, Calif., and William F. Stoesser, 3366 Fayette Drive, Mountain View, Calif.
Filed Sept. 1, 1960, Ser. No. 53,478
12 Claims. (Cl. 317—172)

This invention relates to new and improved torque motors.

The term "torque motor" is commonly applied to small electro-mechnical transducers which are employed for such purposes as controlling valves in response to electrical signals. A number of different devices of this type have been designed, and mathematical theory with respect to devices of this type has been worked out in extreme detail. In spite of this, there is a very definite need for new and improved torque motors, and specifically for torque motors capable of providing a comparatively great, although still relatively small, angular displacement of an actuating member at a comparatively high torque.

An object of the present invention is to provide new and improved torque motors meeting this need. A more specific object of this invention is to provide torque motors including actuating members which are capable of providing a greater amount of angular rotation than prior related devices, and which provide a comparatively high torque as compared with such prior devices. Further objects of the present invention are to provide torque motors having relatively high speeds of response, good reliability, and high power to weight ratios. A still further object of this invention is to provide torque motors as indicated which may be easily and conveniently manufactured at a comparatively nominal cost and which are relatively immune from the effects of vibration or other external forces.

These and other objects of this invention will be more fully apparent from a detailed consideration of the remainder of this specification, the appended claims, and the accompanying drawing in which:

FIG. 1 shows a torque motor of the present invention mounted for use upon a hydraulic valve;

FIG. 2 is a cross-sectional view taken at line 2—2 of FIG. 1;

FIG. 3 is a cross-sectional view taken at line 3—3 of FIG. 1;

FIG. 4 is a cross-sectional view taken at line 4—4 of FIG. 1;

FIG. 5 is a cross-sectional view taken at line 5—5 of FIG. 1;

FIG. 6 is a perspective view of an armature assembly employed in the torque motor shown in the preceding figures; and FIG. 7 is a view similar to FIG. 4 illustrating the construction of a modified torque motor of this invention.

The accompanying drawing is primarily intended so as to clearly illustrate several presently preferred embodiments of the present invention. It will be realized, however, that this invention is not to be considered as being limited to torque motors formed precisely as shown inasmuch as principles of this invention may be embodied within other differently appearing torque motors.

As an aid to understanding this invention it can be stated in essentially summary form that it concerns torque motors having a rotatable armature of ferro-magnetic material which extends generally in a plane passing through its axis of rotation and which is formed so as to be symmetrical with respect to this axis, coil means symmetrically disposed with respect to this axis so as to be traversed by the armature and a permanent magnet circuit consisting of permanent magnets holding pole pieces of ferro-magnetic material located so as to provide symmetrical north and south poles adjacent to this axis and adjacent to the extremities of the armature and spaced from the coil means employed.

The invention is best more fully explained by referring directly to the accompanying drawing in which there is shown a torque motor 10 of this invention mounted upon a mounting plate 12 forming a part of a valve mechanism 14 of known type which is actuated by means of this torque motor 10. Preferably a protective cover 16 is attached as by screws 18 to the valve mechanism 14 so as to protect the torque motor 10 from the effects of dirt, contaminants, or the like.

The torque motor 10 itself includes a generally planar armature 20 which, as shown in FIG. 6 of the drawing, carries a lower shaft 22, an extremity 24 of which is formed so as to serve as a bearing for support purposes. This shaft 22 is preferably formed of a non-ferromagnetic material such as brass, stainless steel or the like. The armature 20 is formed of a ferromagnetic material such as "soft" iron so as to include an elongated slot 26 extending across the axis of the shaft 22 at a right angle to it. It is further provided with an enlarged diameter ferromagnetic top section 28 which extends completely along the length of the slot 26 and past the ends of the slot. A rod-like armature shaft 30 of non-magnetic material, such as brass, stainless steel, or the like, is attached to an extremity of the shaft 22 so as to extend from it in axial alignment with this shaft 22 across the slot 26 up through the section 28. From this description, it will be realized that the armature 20 has flat, opposed terminal faces 32 which are located as closely as possible to the common axis of the shafts 22 and 30. It will be further realized that this armature 20 is bilaterally symmetrical with respect to this common axis.

In the torque motor 10 this armature carries nonconductive coil bobbins 34, each of which carries an electrical coil 36. These coil bobbins 34 and the coils 36 are preferably identically formed so as to weigh the same; they are also preferably symmetrically located as close to the shaft 30 as physically possible in order to hold down the polar moment of inertia about the axis of rotation of this armature 20 to as great an extent as physically possible.

In mounting the torque motor 10 it is preferably located so that the bearing-like extremity 24 is supported against the interior of a cylindrical opening 38 in the mounting plate 12. Further, when so connected preferably this mounting plate 12 carries an attached thin-wall torque tube 40 of berillium-copper or the like having spring characteristics. The extremity of the torque tube 40 remote from the mounting plate 12 is preferably located within the extremity of the shaft 22 immediately adjacent to the slot 26. This extremity preferably is secured to an actuating rod 42. The rod 42 extends through the tube 40 and the opening 38 in the mounting plate 12 into the interior of the valve mechanism 14 where it is utilized in order to control the operation of this valve mechanism. Further, the attached ends of the torque tube 40 and the actuating rod 42 are preferably secured to the shaft 22 as closely adjacent to the slot 26 as is reasonably possible through the use of a small shear pin 44 which extends completely across this shaft 22 and through these extremities of the torque tube 40 and the rod 42. With this structure the spring character of the tube 40 permits rotation of the armature 20 about the axis of this tube. This axis coincides with the axes of the shafts 22 and 30.

In the motor 10 small identical U-shaped permanent magnets 46 are attached to the extremities of identical ferromagnetic pole pieces 48 through the use of mounting screws 50. As is best seen in FIGS. 1 and 5 of the drawing, these pole pieces 48 are located on opposite sides of the faces 32 of the armature 20. It will be noted that the assembly of the magnets 46 and the pole pieces 48 is of a symmetrical character and possesses two axes of symmetry located at right angles to one another. It will also be noted that the south poles of the magnets 46 are joined together by one of the pole pieces 48 and that the north poles of the magnets 46 are joined together by the other of these pole pieces.

Further, the pole pieces 48 are formed so as to have faces 52 which are located equidistant from the axis of rotation of the armature 20, which are directly opposite the faces 32 on the armature 20, and which are located as closely adjacent to the common axis of the shafts 22 and 30 as reasonably possible from a physical standpoint. It will also be noted that the faces 52 on the pole pieces 48 which are adjacent and opposite one another are formed so as to have planar surfaces which are located at acute angles with respect to one another and so that their closest adjacent dimensions are located as close to the common axis of the shafts 22 and 30 as possible. Preferably each of the faces 52 carries an identical non-magnetic stop button 54 designed to prevent the armature 20 from rotating to such an extent that direct physical contact between the faces 32 and the faces 52 is not possible.

In the torque motor 10 the pole pieces 48 carry a non-magnetic yoke 56 which extends from them around the armature 20 and the coils 36 and which is formed so as to include a bearing 58 supporting the extremity of the shaft 30. Screws 60 are preferably used to simultaneously hold this yoke 56, the pole pieces 48, and the magnet 46 with respect to the mounting plate 12.

The construction employed in the torque motor 10 is considered to be advantageous for a number of reasons. This construction is designed so that the weight of the armature 20, of the coil bobbins 34 and of the coils 36 is concentrated as close to the axis of rotation of this armature 20 as is reasonably possible. This keeps the polar moment of inertia about this axis comparatively low when the torque motor 10 is considered or compared with prior related devices. The construction of the motor 10 previously described is also advantageous inasmuch as it provides comparatively short, balanced permanent magnet circuits and a comparatively short electromagnet circuit.

Within these circuits, the pole faces employed in the permanent magnet circuit are located as close as reasonably possible to the axis of rotation of the armature. This makes it possible to provide a structure as described with which comparatively high angular displacement or amount of rotation of the armature can be achieved while still using air gaps between the faces 52 and 32 which are small enough to provide high torque forces. Further, the type of angular orientation of the pole faces 52 with respect to one another as shown makes it possible for the flux provided by the permanent magnet circuit employed to be substantially uniform for all permissible positions of the armature 20. The precise design of the torque motor 10 illustrated is considered to be also comparatively advantageous inasmuch as it has a natural high frequency response as compared to prior related structures. Further, the coils 36 used with this torque motor 10 are employed in such a way that there is comparatively no loss of flux from them as a signal is applied through wires 62 which physically loosely connect them to an appropriate source of controll current (not shown).

Under some circumstances it is desired to utilize a torque motor 70 constructed as indicated in FIG. 7 of the drawing. Since this motor 70 is substantially identical to the motor 10 previously described except as herein indicated the various parts of it are not separately described in this specification, and are indicated both in this specification and in the drawing by the primes of the numerals previously used.

The torque motor 70 differs from the motor 10 in that the coil bobbins 34' and the coils 36' are made sufficiently large so as to be spaced from the section 28' of the armature 20' a sufficient distance to permit desired angular rotation of this armature and are mounted upon the yoke 56' instead of upon this armature 20'. This type of construction provides an armature of a comparatively light weight. It is considered to be particularly desirable where torque motors are to be subjected to high vibrational acceleration or other forces.

Those skilled in the art to which this invention pertains will realize that torque motors as herein described may be easily and conveniently manufactured at comparatively nominal costs, and that performance-wise these torque motors possess a number of advantages over prior related devices as discussed and suggested in preceding portions of this specification. Because of the nature of this invention it is to be considered as being limited only by the appended claims forming a part of this specification.

We claim:

1. A torque motor which includes: bearing means disposed about an axis of rotation; armature means formed of a ferromagnetic material rotatably supported on said bearing means, said armature means having a central section extending across said axis and having pole faces magnetically insulated from one another located on opposite sides of said axis and adjacent to said axis, said pole faces and said central sections being displaced from one another along said axis of rotation; coil means for creating magnetic flux in said armature means located so as to surround said armature means and permanent magnet means for creating north and south magnetic poles adjacent to each of said pole faces, each of said pole faces being located between a north and a south pole of said permanent magnet means.

2. A torque motor as defined in claim 1 including spring means for positioning said armature so that said pole faces are midway between said north and south poles.

3. A torque motor as defined in claim 2 wherein said spring means comprises a torque tube.

4. A torque motor as defined in claim 1 wherein said bearing means comprises two separate bearings, spaced from one another, and wherein extremities of said armature remote from one another are supported by said bearings.

5. A torque motor as defined in claim 1 wherein said coil means are mounted on said armature so as to be capable of movement therewith.

6. A torque motor as defined in claim 1 wherein said coil means are spaced from and unattached to said armature means.

7. A torque motor which comprises: armature means, said armature means including a planar piece of ferromagnetic armature material formed so as to have a shape which is symmetrical about an axis of symmetry and so as to have pole faces located on opposite sides of said axis of symmetry and adjacent thereto and a slot located at a right angle to said axis of symmetry along side edges of said pole faces, the portion of said piece of ferromagnetic material extending along said slot on the side thereof remote from said pole faces having a circular cross-sectional configuration, said ferromagnetic material being so shaped as to provide a path for magnetic flux connecting said pole faces, said armature means also including a non-ferromagnetic tubular shaft attached to the edges of said pole faces adjacent to said axis of symmetry, said tubular shaft extending away from said piece of ferromagnetic material on the edge thereof remote from said portion of circular cross-sectional configuration, said armature means also including shaft means extending away from said piece of ferromagnetic material of circular cross-sectional configuration, said tubular shaft and said shaft means being axially aligned with one another and with the axis of symmetry of said piece of ferromagnetic material; bearing means supporting the extending-extremity of said tubular shaft and other bearing means supporting said shaft means, both of said bearing means serving to rotatably support said armature means and being structurally connected together; permanent magnet means including two permanent magnets of equal strength and two pole pieces, each of said permanent magnets being located in contact with both of said pole pieces, one of said pole pieces connecting the south poles of said permanent magnets, the other of said pole pieces connecting the north poles of said permanent magnets, said permanent magnets and said pole pieces being attached together so as to define an assembly surrounding said pole faces of said armature means, each of said pole pieces having a face opposite a side of one of each of said pole faces, said faces on said pole pieces being located equi-distant from said axis of said symmetry and adjacent to and spaced from said pole faces so as to permit rotation of said armature means; coil means operatively associated with said armature means, said coil means surrounding said portion of circular cross-sectional configuration and being symmetrically disposed with respect to said axis of symmetry.

8. A torque motor as defined in claim 7 including spring means for positioning said armature so that said pole faces are midway between said north and south poles.

9. A torque motor as defined in claim 8 wherein said spring means comprises a torque tube.

10. A torque motor as defined in claim 7 wherein said coil means are mounted on said armature so as to be capable of movement therewith.

11. A torque motor as defined in claim 7 wherein said coil means are spaced from and unattached to said armature means.

12. A torque motor which includes: bearing means disposed about an axis of rotation; armature means formed of a ferromagnetic material rotatably supported on said bearing means, said armature means having a central section extending across said axis and having pole faces magnetically insulated from one another located on opposite sides of said axis and adjacent to said axis, said pole faces and said central section being displaced from one another along said axis of rotation; coil means for creating magnetic flux in said armature means located so as to surround said armature means, said pole faces and said coil means being displaced from one another along said axis of rotation, said coil means surrounding said central section; and permanent magnet means for creating north and south magnetic poles adjacent to each of said pole faces, each of said pole faces being located between a north and a south pole of said permanent magnet means.

References Cited in the file of this patent
UNITED STATES PATENTS

| | | |
|---|---|---|
| 2,905,871 | Martin | Sept. 22, 1959 |
| 2,962,611 | Atchley | Nov. 29, 1960 |